United States Patent

Baligh et al.

(10) Patent No.: US 10,425,198 B2
(45) Date of Patent: Sep. 24, 2019

(54) SYSTEM AND METHOD FOR COMMUNICATING USING SCMA

(71) Applicants: Mohammadhadi Baligh, Ottawa (CA); Alireza Bayesteh, Ottawa (CA)

(72) Inventors: Mohammadhadi Baligh, Ottawa (CA); Alireza Bayesteh, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 55 days.

(21) Appl. No.: 15/204,468

(22) Filed: Jul. 7, 2016

(65) Prior Publication Data

US 2018/0013525 A1   Jan. 11, 2018

(51) Int. Cl.
H04L 5/00 (2006.01)
H04W 4/70 (2018.01)
H04L 27/26 (2006.01)

(52) U.S. Cl.
CPC ........ H04L 5/0007 (2013.01); H04L 27/2633 (2013.01); H04W 4/70 (2018.02)

(58) Field of Classification Search
CPC . H04L 27/3411; H04L 27/2634; H04L 5/0007
See application file for complete search history.

(56) References Cited

U.S. PATENT DOCUMENTS

| | | | |
|---|---|---|---|
| 2014/0140360 A1* | 5/2014 | Nikopour | H04J 13/00 370/479 |
| 2014/0376518 A1 | 12/2014 | Palanki et al. | |
| 2016/0049999 A1 | 2/2016 | Boroujeni et al. | |
| 2016/0050039 A1 | 2/2016 | Ma et al. | |
| 2017/0033912 A1* | 2/2017 | Onggosanusi | H04B 7/0626 |
| 2017/0064645 A1 | 3/2017 | Taherzadeh Boroujeni et al. | |
| 2017/0251517 A1* | 8/2017 | Kimura | H04W 76/046 |

FOREIGN PATENT DOCUMENTS

| | | |
|---|---|---|
| CN | 104798317 A | 7/2015 |
| CN | 105141566 A | 12/2015 |
| EP | 1922830 A2 | 5/2008 |
| WO | 2017196703 A1 | 11/2017 |

OTHER PUBLICATIONS

Nikopour, Hosein et al., "SCMA for Downlink Multiple Access of 5G Wireless Networks", 2014 IEEE Global Communications Conference, IEEE, 2014.

(Continued)

Primary Examiner — Shukri Taha

(57) ABSTRACT

Systems and methods for DFT-S-SCMA (discrete Fourier Transform-spread-sparse code multiple access) are provided. Input bits are encoded with an SCMA encoder. The output is precoded with a IDFT (inverse DFT) to produce a precoded SCMA block. Multiple precoded SCMA blocks are combined at the input of a DFT. This is done in parallel for multiple sets of SCMA blocks at multiple DFTs. Then, the outputs of the DFTs are combined and OFDM modulated. This approach can be used to improve the PAPR (peak to average power ratio) at the output of the OFDM modulation.

20 Claims, 4 Drawing Sheets

(56) References Cited

OTHER PUBLICATIONS

Bayesteh, Alireza et al., "Low Complexity Techniques for SCMA Detection", 2015 IEEE Globecom Workshops (GC Wkshps), IEEE, 2015.
Al-Imari, Mohammed et al., (Sep. 2010), "Reducing the Peak to Average Power Ratio of LDS-OFDM Signals", 2010 7th International Symposium on Wireless Communication Systems (ISWCS), (pp. 922-926), IEEE.
Taherzadeh, Mahmoud et al., (Sep. 2014), "SCMA Codebook Design", 2014 IEEE 80th Vehicular Technology Conference (VTC2014-Fall) (pp. 1-5), IEEE.
Nikopour, Hosein et al., "Sparse Code Multiple Access", 2013 IEEE 24th Symposium on Personal, Indoor and Mobile Radio Communications: Fundamentals and PHY Track, IEEE, 2013.
Al-Imari M et al: "Reducing the Peak to Average Power Ratio of LDS-OFDM signals", Wireless Communication Systems (ISWCS), 2010 7th International Symposium on, IEEE, Piscataway, NJ, USA, Sep. 19, 2010, pp. 922-926, XP031792306.
Han Yuxi et al: "Enabling SCMA long codewords with a parallel SCMA coding scheme", 2015 International Conference on Wireless CommunicationsandSignal Processing (WCSP), IEEE, Oct. 15, 2015, pp. 1-6, XP032820446.
Huawei Technologies Co. et al: "5G: New Air Interface and Radio Access Virtualization", Huawei White Paper, Apr. 30, 2015, pp. 1-6, XP055332584.
3GPP TSG RAN WG1 Meeting #86, R1-167615, Sharp: "Multiple access schemes for NR", Gothenburg, Sweden, Aug. 22-26, 2016. 8 pages. XP051142084.

\* cited by examiner

SYSTEM AND METHOD FOR COMMUNICATING USING SCMA

FIELD

The application relates to transmitters and methods for communicating using sparse code multiple access (SCMA).

BACKGROUND

Some systems require and/or would benefit from low-peak-to-average power ratio (PAPR) transmission. This may be particularly important for massive Internet of Things (IoT) applications in which the transmitters are machine type communications (MTC) transmitters that are inexpensive and do not have a high power amplifier capability.

SCMA provides good performance and flexibility for massive connectivity required for uplink grant-free transmission suitable for massive IoT applications. SCMA provides a good tradeoff in terms of performance, complexity and massive connectivity. Low-PAPR SCMA codebooks have been proposed but these only work for very narrowband transmission. Low PAPR SCMA codebooks contain only one non-zero component in each of the codewords associated to the same layer. The tone hopping feature of the codebook allows for constant amplitude on OFDM. That is only true for one SCMA spreading block per OFDM symbol. Multiple blocks will result in higher PAPR.

SUMMARY

A broad aspect of the invention provides a method of communicating using SCMA. The method begins with concatenating a first group of precoded SCMA blocks to produce a first concatenated output. The first concatenated output is discrete Fourier Transform (DFT) precoded to produce a first precoded output. Then, OFDM modulation is performed based on the first precoded output.

In some embodiments, SCMA encoding involves using an SCMA codebook in which each codeword has one non-zero element. In other embodiments, SCMA encoding involves using an SCMA codebook in which each codeword has at least two non-zero elements.

In some embodiments, the precoding is performed using a matrix that selected based on a resulting PAPR for the precoded SCMA blocks.

In some embodiments, the concatenating and DFT precoding steps are performed for each of a plurality of groups of precoded SCMA blocks inclusive of the first group to produce a plurality of precoded outputs inclusive of the first precoded output. In this case, performing OFDM modulation involves performing OFDM modulation based on the plurality of precoded outputs.

Another broad aspect of the invention provides a transmitter having a first group of precoded SCMA block generators that generate a first group of precoded SCMA blocks, a first concatenator that concatenates the first group of precoded SCMA blocks to produce a first concatenated output, a first DFT precoder that precodes the first concatenated output to produce a first precoded output; and an OFDM modulator that performs OFDM modulation based on the first precoded output.

In some embodiments, each SCMA block generator includes an SCMA encoder and a precoder that implements a linear matrix.

In some embodiments, the SCMA encoder uses an SCMA codebook in which each codeword has one non-zero element. In other embodiments, the SCMA encoder uses an SCMA codebook in which each codeword has at least two non-zero elements.

In some embodiments, the precoder uses a matrix that selected based on a resulting PAPR for the precoded SCMA blocks.

In some embodiments, there are a plurality of groups of precoded SCMA block generators configured to generate a plurality of groups of precoded SCMA blocks; a plurality of concatenators each configured to concatenate one of the plurality of groups of precoded SCMA blocks to produce a plurality of concatenated outputs; and a plurality of DFT precoders each configured to precode one of the plurality of concatenated outputs to produce a respective precoded output. In such embodiments, the OFDM modulator performs OFDM modulation based on the precoded outputs.

Another aspect provides a user equipment comprising the above-summarized transmitter, for example a machine type communication (MTC) device.

BRIEF DESCRIPTION OF THE DRAWINGS

Embodiments of the invention will now be described with reference to the attached drawings in which.

DETAILED DESCRIPTION

Figure 1:
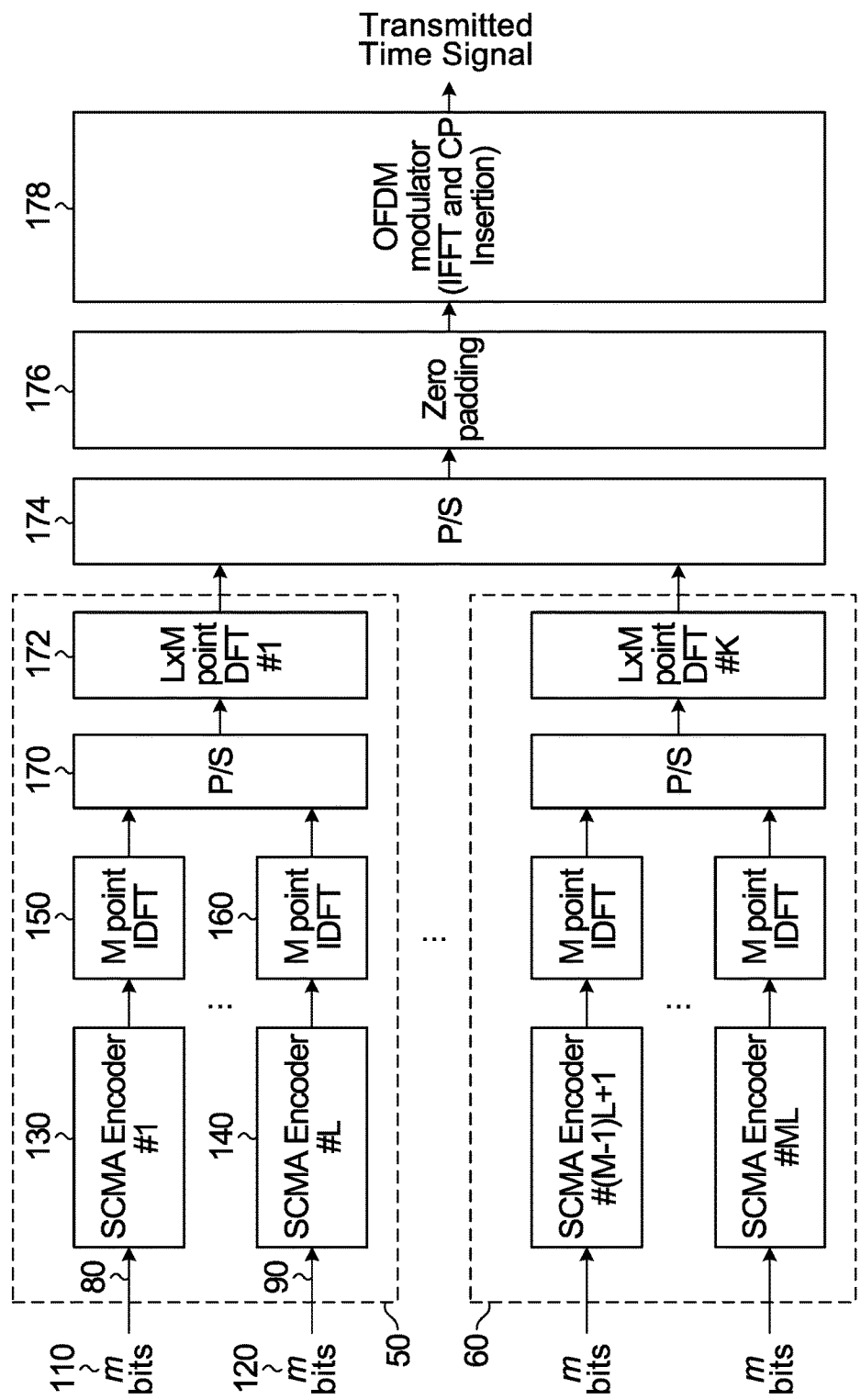
FIG. 1 is a block diagram of a transmitter for communicating using SCMA provided by an embodiment of the invention.

Generally, embodiments of the present disclosure provide a method and apparatus for communicating using SCMA. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Referring to FIG. 1, shown is a block diagram of a DFT-s-SCMA (discrete Fourier transform-spread-sparse code multiple access) transmitter provided by an embodiment of the invention. The transmitter may, for example, be part of a user equipment, such as an MTC user equipment. It should be understood that the Figure shows features of the transmitter necessary for an understanding of the invention, but that typically a transmitter will include other functionality, not shown.

For the purpose of this example, L×M×K OFDM subcarriers are assigned to the transmitter. L, M and K are described in detail below, but briefly, K is the number of SCMA-DFT blocks; M is the codeword length for the SCMA encoders, and M is also the block size for the precoded SCMA blocks, i.e. each precoded SCMA block occupies M resource elements, and L is the number of precoded SCMA blocks that are concatenated in each SCMA-DFT block.

Shown are K SCMA-DFT blocks 50, . . . ,60 (only two shown) connected to a parallel to serial converter 174. The output of the parallel to serial converter 174 is connected to zero padder 176 which in turn is connected to an OFDM modulator 178 which may, for example, be realized with an IFFT and CP insertion block.

The first SCMA-DFT block 50 will now be described in detail. The SCMA-DFT block 50 has L inputs 80, . . . ,90 (only two shown). The inputs 80, . . . ,90 are connected to L SCMA encoders 130, . . . ,140 (only two shown). The L SCMA encoders 130, . . . ,140 have outputs connected to L M-point IDFT blocks 150, . . . ,160 (only two shown). The outputs of the L M-point IDFT blocks are connected to a parallel to serial converter 170, the output of which is connected to an input of an L×M point DFT precoder 172.

The structure of the other SCMA-DFT blocks is generally the same. In some embodiments, L is the same for all SCMA-DFT blocks 50, . . . ,60. In some embodiments, L is not necessarily the same for all SCMA-DFT blocks 50, . . . ,60.

The operation of the first SCMA-DFT block 50 will now be described. To begin, m bits (typically from a coded bitstream) are input to each of the SCMA encoders 130, . . . ,140 via the L inputs 80, . . . ,90. The SCMA encoders 130, . . . ,140 operate with SMCA codebooks with codewords of length M. The number m of input bits processed by each SCMA encoder is >=2, and the number L of SCMA encoders is >=2. The SCMA encoders 130, . . . ,140 map the input bits to SCMA codewords, and the output of each SCMA encoder 130, . . . ,140 is a respective SCMA codeword, with L SCMA codewords being produced in the first SCMA-DFT block 50 in total.

The L SCMA codewords are then precoded by the L M-point IDFT blocks 150, . . . ,160 to produce L precoded SCMA blocks. Each precoded SCMA block consists of M resource elements and the L SCMA blocks collectively consist of L×M resource elements, for example L×M adjacent tones. For better performance, the L×M adjacent tones should experience a relatively flat channel. The L precoded SCMA blocks are concatenated with parallel to serial converter 170 to produce a concatenated output in the form of a serial stream that is input to the L×M point DFT precoder 172. The concatenated output is then precoded by the L×M point DFT procoder 172 to produce a precoded output. In the example described, each precoded SCMA block has M resource elements. In some embodiments, each precoded SCMA block may have more than M resource elements.

The other SCMA-DFT blocks 160 function similarly to produce respective precoded outputs. The precoded outputs of the K SCMA-DFT blocks 50, . . . ,60 are converted to parallel form in parallel to serial converter 174. Zero padding is added in the zero padder 176. The output of the zero padder 176 is input to the OFDM modulator 178 which produces a time signal for transmission.

In a system with a certain bandwidth, typically the total number of useful subcarriers is known. For example, in a system with a 10 MHz bandwidth, the total number of useful subcarriers is might be 600. Of those, a particular transmitter might be allocated a subset of them e.g. 120. These subcarriers may be adjacent or not. At the end, the OFDM modulator employs an IFFT of size bigger than the number of useful subcarriers e.g. 1024. Zero padding is used to (1) pad zeros on the subcarriers not allocated to this transmitter (possibly allocated to other users) and (2) pad zeros on the extra locations of the IFFT that cannot be assigned to anyone.

In the illustrated example, there are K SCMA-DFT blocks, with K>=2. In another embodiment there is only one DFT-SCMA block, i.e. K=1.

As noted above, for better performance, the L×M tones processed by a given DFT should experience a relatively flat channel. For IoT applications, for example MTC devices, and power limited users, typically only narrow band resources are assigned and the above property will typically hold. Where K>1, the channel need not be flat over the entire L×M×K tones input to the K DFTs collectively.

In some embodiments, for wideband assignment, the assigned bandwidth is divided into smaller blocks where the channel is substantially constant. The embodiment of FIG. 1 is an example of this. The selection of K represents a tradeoff between performance and PAPR. With K=1, this is the best situation for PAPR, but because the channel many not be constant across the entire band, this could affect BLER performance. On the other hand, with increased K, PAPR will also increase; however, the channel may be relatively flat over each block, and the BLER performance will improve. A PAPR requirement can be associated with a particular power amplifier design. A larger value of K can allow PAPR requirement to be met, at some cost in terms of BLER performance. In some embodiments, L and K are selected to achieve an acceptable tradeoff between PAPR and BLER.

For non-adjacent resource assignment, different groups of resources may be subject to different DFT blocks.

In the above example, the precoded SCMA blocks are generated by first SCMA encoding the input bits, and then processing the SCMA codeword with a DFT. More generally, the SCMA codewords may be precoded with a linear matrix, and in some embodiments the linear matrix is a unitary matrix. In either case, the precoded SCMA blocks may be generated by performing the SCMA encoding, and precoding (with the IDFT or other matrix) as separate steps or functional blocks. Alternatively, the two steps can be combined in a single step or functional block. In a specific example, the two steps are performed by way of table lookup in a single combined step or functional block. The functionality of the SCMA encoder and the precoder together, implemented separately or as one functional unit, is also referred to herein as a precoded SCMA block generator.

Figure 2:
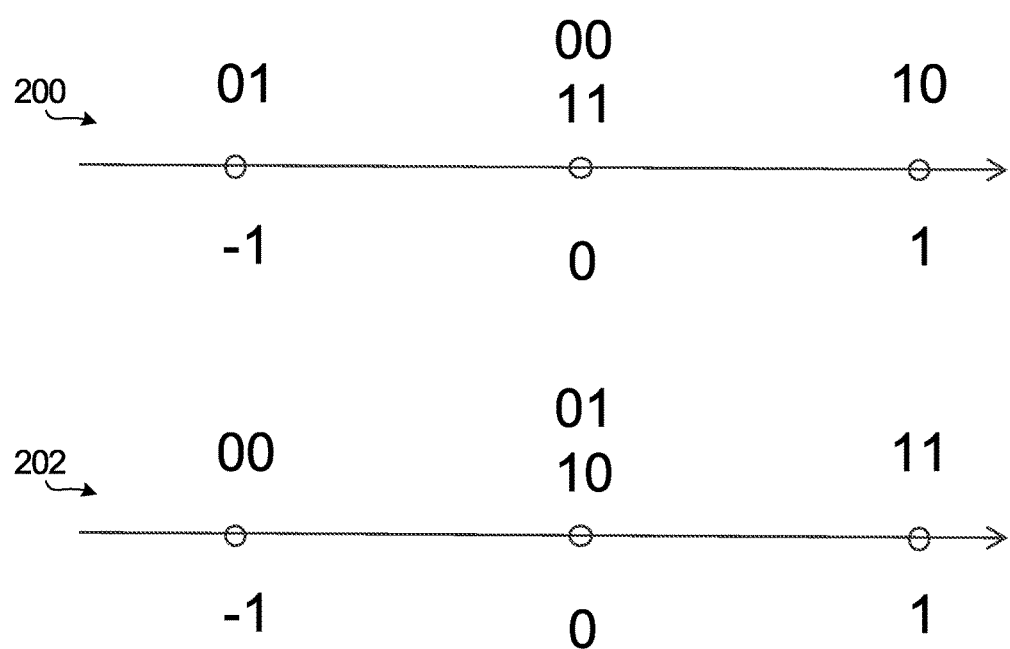
FIG. 2 is example of an SCMA codebook with low PAPR.

In a first example, the SCMA encoder is a low PAPR SCMA encoder. For example, an SCMA encoder that produces codewords with only one non-zero projection for all codewords is a low PAPR SCMA encoder, as the output has constant envelope. FIG. 2 shows a specific example of a low PAPR SCMA codebook. Two input bits are mapped to two tones (out of a total number of tones M for the SCMA codewords, the remaining M−2 tones being zero). The mapping for the first tone is indicated at 200, and the mapping for the second tone is indicated at 202. It can be seen that for any set of input bits, the mapping to one of the two tones is a zero. As such, there is only one non-zero projection.

This use of the IDFT for precoding the SCMA codewords is suitable when the SCMA encoder is a low PAPR SCMA encoder.

Figure 3:
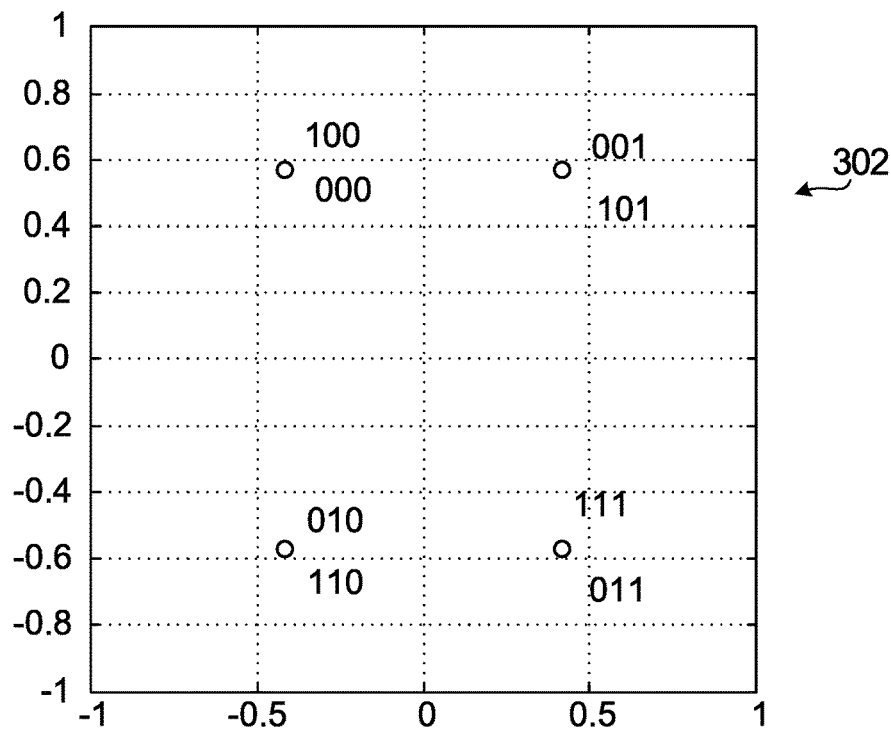
FIG. 3 is an example of an SCMA codebook that does not have low PAPR.
Figure 3:
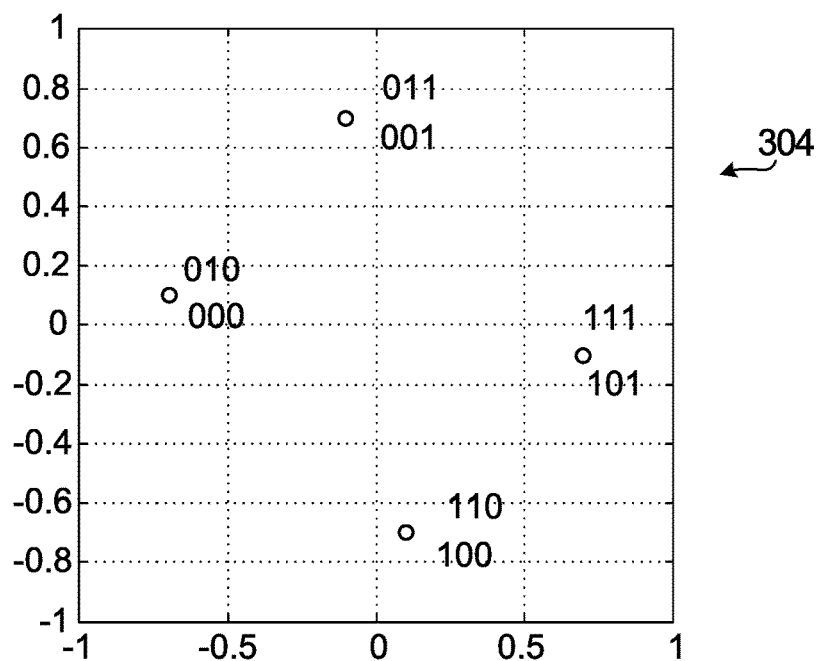

In a second example, the SCMA encoder is not a low PAPR SCMA encoder. This is the case where the SCMA codewords have more than one non-zero projection. An example of such a codebook is depicted in FIG. 3. Here, three bits are mapped to two tones (out of a total of M, the remaining M−2 tones being zero). The mapping for the first tone is indicated at 300, and the mapping for the second tone is indicated at 302. In this example, many 3-bit permutations get mapped to non-zero values over both tones. Use of an IDFT to perform the precoding may not result in the lowest possible PAPR for such implementations. As such, while an IDFT may still be used in such implementations, in some embodiments, a different linear matrix or unitary matrix may be employed that yields better PAPR than the IDFT. The matrix may be selected to optimize the PAPR. In a specific example of a method of selecting a matrix, unitary matrices are generated at random, and the resulting PAPR assessed. Then, a unitary matrix that provides the best PAPR as among the assessed matrices, or at least an acceptable PAPR, is selected and implemented in the transmitter.

In a multi-carrier system such as OFDM, multiple sinusoids are added together at different frequencies. When multiple sinusoids are added together, the result has high power some of the time and low power some of the time, which is equivalent to a high PAPR. High PAPR can cause signal distortion and lower performance.

For SCMA the best case for PAPR is to have just one non-zero tone per SCMA block. With this scenario, the peak=the average, and PAPR is the minimum possible. In designs with multiple non-zero tones per SCMA block, the PAPR is not minimized.

In the described embodiments, multiple SCMA blocks are combined in the transmitter. For example, there may be 10 SCMA blocks, each of which is low PAPR as per the first example described above. Adding multiple SCMA blocks in the frequency domain will produce a result that is no longer low PAPR. To reduce the PAPR, precoding is used after the SCMA encoding. The resulting operation reduces the PAPR of the multiple SCMA blocks to almost the PAPR of a single SCMA block.

If the SCMA codebook from beginning is not low PAPR as per the second example described above, it is not possible to use precoding to reduce the overall PAPR to below that of a single SCMA block. However, the precoding can still be used to reduce the PAPR even if the result is not equivalent to that of a low PAPR system.

In the embodiments described above, the precoded SCMA blocks are then precoded by the L×M point DFT, and after that OFDM modulation is performed. While the IFFT used as part of OFDM modulation tends to increase PAPR, the DFT precoding tends to reduce it. More generally, any multi-carrier modulation scheme may be employed instead of OFDM. In such embodiments, the L×M point DFT may be replaced with a different unitary matrix.

In the above described embodiment, the precoded SCMA blocks are concatenated with a parallel to serial converter in each SCMA DFT block. More generally, any concatenator can be employed to this effect.

Figure 4:
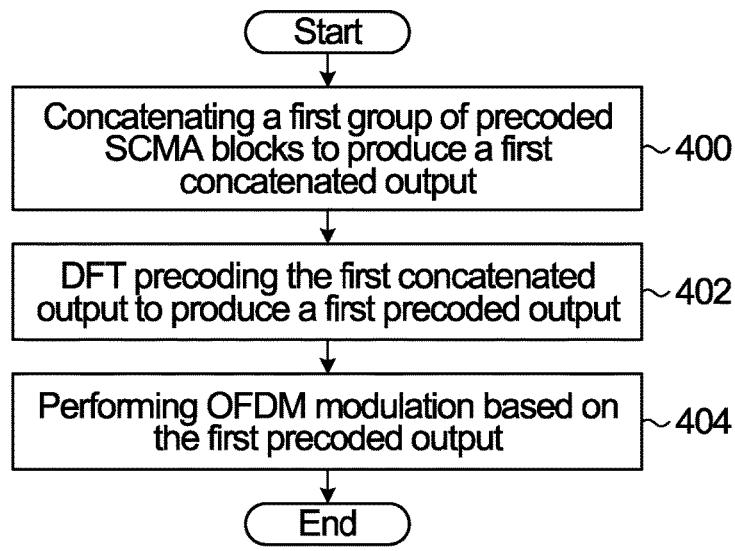
FIG. 4 is a flowchart of a method of communicating using SCMA provided by an embodiment of the invention.

Referring now to FIG. 4, shown is a flowchart of a method of communicating using SCMA provided by an embodiment of the invention. Block 400 involves concatenating a first group of precoded SCMA blocks to produce a first concatenated output. Block 402 involves DFT precoding the first concatenated output to produce a first precoded output. Block 404 involves performing OFDM modulation based on the first precoded output.

The method of FIG. 4 may, for example, be performed using a transmitter similar to that of FIG. 1.

Figure 5:
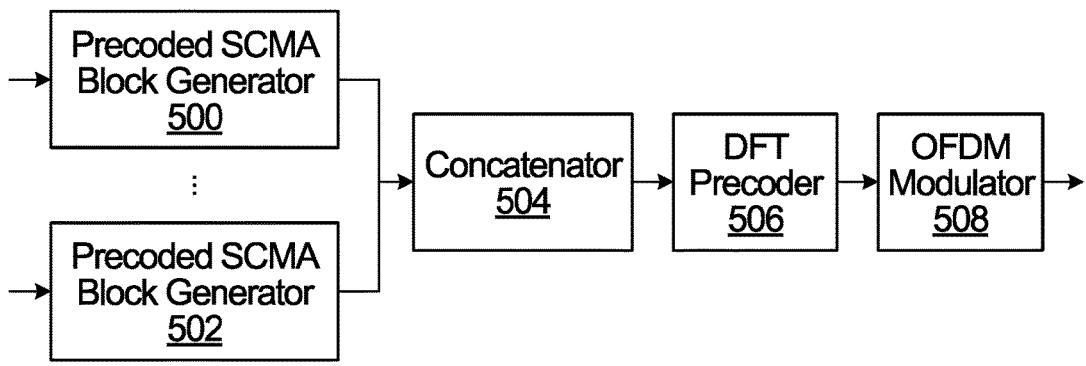
FIG. 5 is a block diagram of another transmitter for communicating using SCMA provided by an embodiment of the invention.

Referring now to FIG. 5, shown is a block diagram of another transmitter provided by an embodiment of the invention. It is noted that the method of FIG. 4 can also be performed using a transmitter similar to that of FIG. 5. The transmitter includes a group of precoded SCMA block generators 500, . . . ,502 configured to generate a group of precoded SCMA blocks. A concatenator 504 is configured to concatenate the group of precoded SCMA blocks to produce a concatenated output. A DFT precoder 506 is configured to precodes the concatenated output to produce a precoded output. Finally, an OFDM modulator 508 is configured to perform OFDM modulation based on the precoded output. In some embodiments, the functionality before the OFDM modulator 508 including the group of SCMA block generators 500, . . . ,502, the concatentor 504 and the DFT precoder 506 is replicated such that the OFDM modulator 508 receives inputs from each of the DFT precoders.

In some embodiments, the method further includes generating the first group of precoded SCMA blocks by for each precoded SCMA block, SCMA encoding a respective set of input bits to produce a respective SCMA codeword, and processing the respective SCMA codeword with a linear matrix.

All of the generalizations described above regarding the number of groups of precoded SCMA, SCMA encoding, precoding the SCMA blocks, DFT precoding, and OFDM modulation also apply to the method of FIG. 4.

In some embodiments, the described approach is performed simultaneously by multiple user equipment transmitting on the same resource. In such embodiments, each user equipment is assigned a distinct SCMA codebook layer.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method comprising:
sparse code multiple access (SCMA) encoding a respective set of input bits to produce a respective SCMA codeword;
precoding each SCMA codeword to produce a respective precoded SCMA block;
concatenating a first group of precoded SCMA blocks to produce a first concatenated output in which the first group of precoded SCMA blocks are consecutively arranged;
discrete Fourier Transform (DFT) precoding the first concatenated output to produce a first precoded output; and performing orthogonal frequency-division multiplexing (OFDM) modulation based on the first precoded output.

2. The method of claim 1 wherein precoding each SCMA codeword comprises:
multiplying the respective SCMA codeword by a linear matrix.

3. The method of claim 2 wherein SCMA encoding comprises using an SCMA codebook in which each codeword has one non-zero element.

4. The method of claim 2 wherein the linear matrix is a unitary matrix.

5. The method of claim 4 wherein the unitary matrix is an IDFT.

6. The method of claim 2 wherein SCMA encoding comprises using an SCMA codebook in which each codeword has at least two non-zero elements.

7. The method of claim 6 wherein the linear matrix is a matrix that selected based on a resulting peak to average power ratio (PAPR) for the precoded SCMA blocks.

8. The method of claim 1 further comprising generating the first group of precoded SCMA blocks by using a table lookup.

9. The method of claim 1 further comprising:
performing the concatenating and DFT precoding steps for each of a plurality of groups of precoded SCMA blocks to produce a plurality of precoded outputs;
wherein performing OFDM modulation comprises performing OFDM modulation based on the plurality of precoded outputs.

10. A transmitter comprising:
a first group of precoded sparse code multiple access (SCMA) block generators that generates a first group of precoded SCMA blocks by SCMA encoding input bits to produce SCMA codewords and then precoding the SCMA codewords to produce precoded SCMA blocks;
a first concatenator that concatenates the first group of precoded SCMA blocks to produce a first concatenated output in which the first group of precoded SCMA blocks are consecutively arranged;
a first discrete Fourier Transform (DFT) precoder that precodes the first concatenated output to produce a first precoded output; and
an orthogonal frequency-division multiplexing (OFDM) modulator that performs OFDM modulation based on the first precoded output.

11. The transmitter of claim 10 wherein each precoded SCMA block generator comprises:
an SCMA encoder; and
a precoder that implements a linear matrix.

12. The transmitter of claim 11 wherein the SCMA encoder uses an SCMA codebook in which each codeword has one non-zero element.

13. The transmitter of claim 12 wherein the linear matrix is a unitary matrix.

14. The transmitter of claim 13 wherein the unitary matrix is an IDFT.

15. The transmitter of claim 11 wherein each SCMA encoder uses an SCMA codebook in which each codeword has at least two non-zero elements.

16. The transmitter of claim 15 wherein the linear matrix is a matrix that is selected based on a resulting PAPR for the precoded SCMA blocks.

17. The transmitter of claim 10 wherein the SCMA block generators generate the first group of precoded SCMA blocks by using a table lookup.

18. The transmitter of claim 10 further comprising:
a plurality of groups of precoded SCMA block generators configured to generate a plurality of groups of precoded SCMA blocks;
a plurality of concatenators each configured to concatenate one of the plurality of groups of precoded SCMA blocks to produce a plurality of concatenated outputs;
a plurality of DFT precoders each configured to precode one of the plurality of concatenated outputs to produce a respective precoded output;
wherein OFDM modulator performs OFDM modulation based on the precoded outputs.

19. A user equipment comprising the transmitter of claim 11.

20. The user equipment of claim 19, wherein the user equipment is an machine type communication (MTC) device.

* * * * *